(12) United States Patent
Salvoni

(10) Patent No.: US 7,997,046 B2
(45) Date of Patent: Aug. 16, 2011

(54) MACHINE FOR SEALING CONTAINERS BY APPLYING A COVERING FILM

(75) Inventor: Paolo Salvoni, I-Corte Franca (IT)

(73) Assignee: CFS Palazzolo S.p.A., Palazzolo (IT)

(*) Notice: Subject to any disclaimer, the term of this patent is extended or adjusted under 35 U.S.C. 154(b) by 327 days.

(21) Appl. No.: 11/530,503

(22) PCT Filed: Mar. 10, 2005

(86) PCT No.: PCT/EP2005/002540
§ 371 (c)(1),
(2), (4) Date: May 27, 2008

(87) PCT Pub. No.: WO2005/095212
PCT Pub. Date: Oct. 13, 2005

(65) Prior Publication Data
US 2008/0245031 A1 Oct. 9, 2008

(30) Foreign Application Priority Data

Mar. 11, 2004 (EP) .................................. 04 005 766
Mar. 12, 2004 (EP) .................................. 04 005 990

(51) Int. Cl.
*B65B 57/04* (2006.01)
*B65G 43/08* (2006.01)

(52) U.S. Cl. ............................. 53/69; 53/76; 198/464.3
(58) Field of Classification Search ............... 53/52, 498, 53/500, 64, 67, 69, 76; 198/347.1, 464.2, 198/464.3, 572, 575, 460.1, 461.1, 461.2
See application file for complete search history.

(56) References Cited

U.S. PATENT DOCUMENTS

| | | | | |
|---|---|---|---|---|
| 1,975,394 A * | 10/1934 | Hartman | ......................... | 53/52 |
| 3,075,630 A * | 1/1963 | Fisk | ............................. | 198/572 |
| 3,908,333 A * | 9/1975 | Cavanna | ......................... | 53/51 |
| 4,197,935 A * | 4/1980 | Aterianus et al. | ......... | 198/460.1 |
| 4,360,098 A * | 11/1982 | Nordstrom | ................ | 198/460.1 |
| 4,394,896 A * | 7/1983 | McComas et al. | ........ | 198/341.06 |
| 4,507,908 A * | 4/1985 | Seragoli | ........................ | 53/498 |
| 4,640,408 A * | 2/1987 | Eaves | ........................ | 198/460.1 |
| 5,038,915 A * | 8/1991 | Delsanto | .................... | 198/419.3 |
| 5,097,939 A * | 3/1992 | Shanklin et al. | .......... | 198/419.2 |
| 5,183,144 A * | 2/1993 | Francioni | ...................... | 198/415 |
| 5,267,638 A | 12/1993 | Doane | .......................... | 198/357 |
| 5,341,915 A * | 8/1994 | Cordia et al. | ............. | 198/460.1 |
| 5,560,184 A * | 10/1996 | Tisma | ............................ | 53/531 |
| 5,768,856 A * | 6/1998 | Odenthal | ........................ | 53/443 |
| 6,000,528 A * | 12/1999 | van Maanen | ............. | 198/461.1 |
| 6,098,785 A * | 8/2000 | Van Maanen | ............. | 198/459.8 |
| 6,227,346 B1 | 5/2001 | Lecomte et al. | .......... | 198/418.1 |
| 6,244,421 B1 * | 6/2001 | Hall | ............................ | 198/460.1 |
| 6,540,063 B1 | 4/2003 | Fallas et al. | ................ | 198/461.1 |
| 6,648,125 B1 * | 11/2003 | Bershadsky | .............. | 198/460.1 |
| 7,017,321 B2 * | 3/2006 | Salvoni | .......................... | 53/76 |
| 2001/0035332 A1 | 11/2001 | Zeitler | ...................... | 198/464.3 |

FOREIGN PATENT DOCUMENTS

| | | |
|---|---|---|
| EP | 0 680 880 A1 | 11/1995 |
| EP | 0 802 131 A1 | 10/1997 |
| GB | 1 593 080 | 7/1881 |
| GB | 2129754 A * | 5/1984 |
| JP | 06227641 A * | 8/1994 |

* cited by examiner

*Primary Examiner* — Stephen F Gerrity
(74) *Attorney, Agent, or Firm* — Dobrusin & Thennisch PC

(57) ABSTRACT

A machine for sealing containers by applying a covering film or a lid, which is located downstream of an infeed system for feeding containers to be sealed, the infeed system including an accumulation unit driven by motor and located downstream relative to a feeder unit driven by motor the feeder unit feeding containers to the accumulation unit.

17 Claims, 4 Drawing Sheets

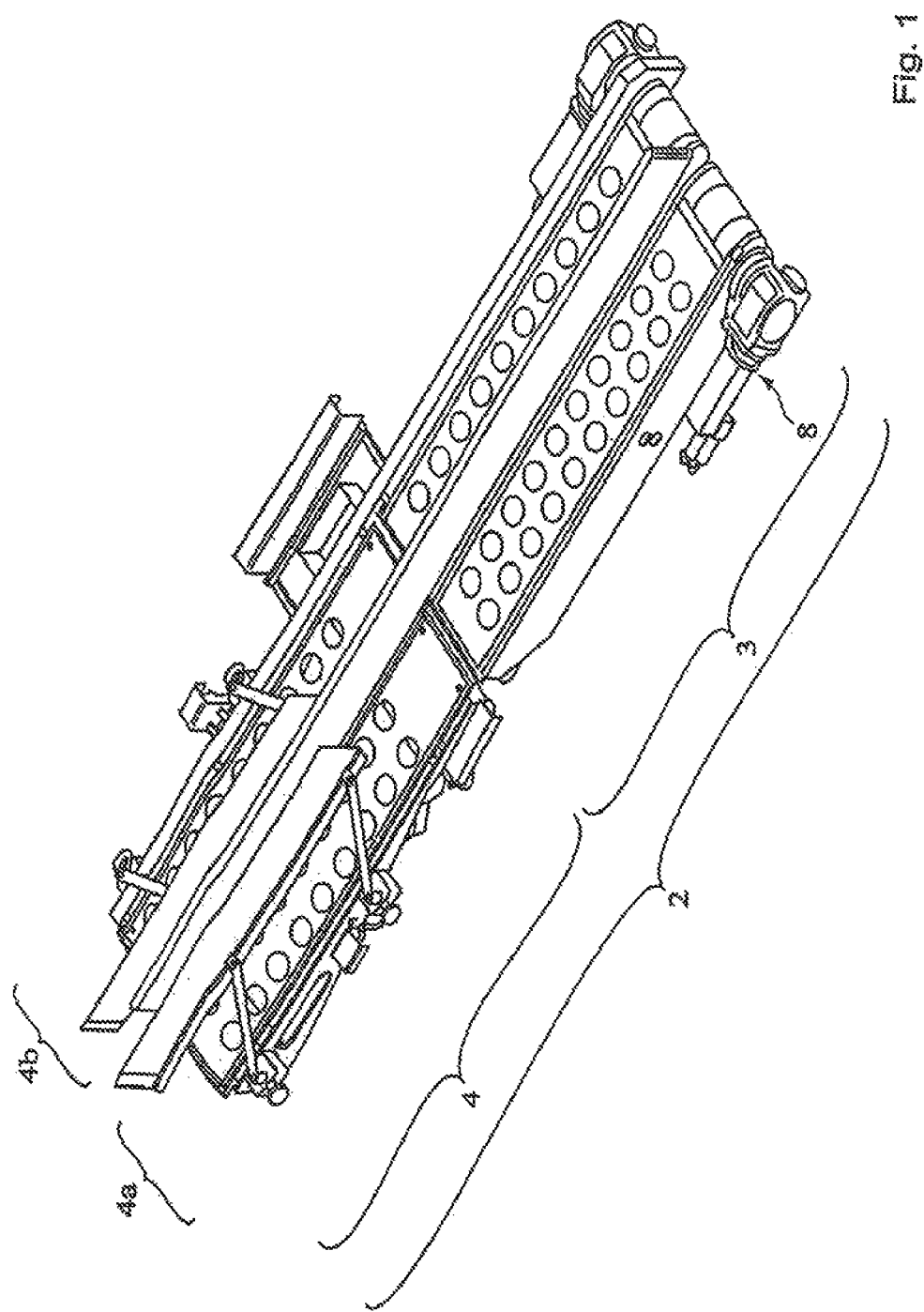

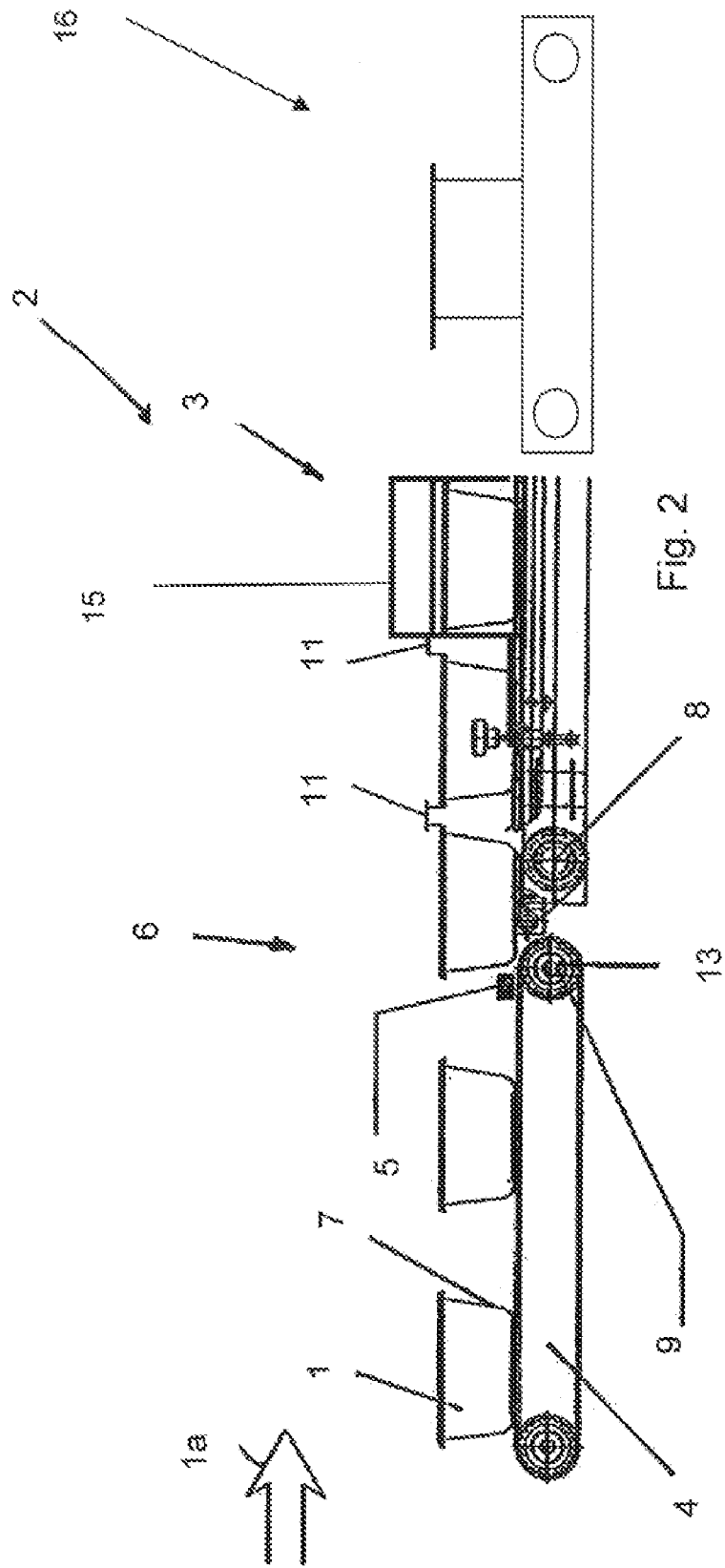

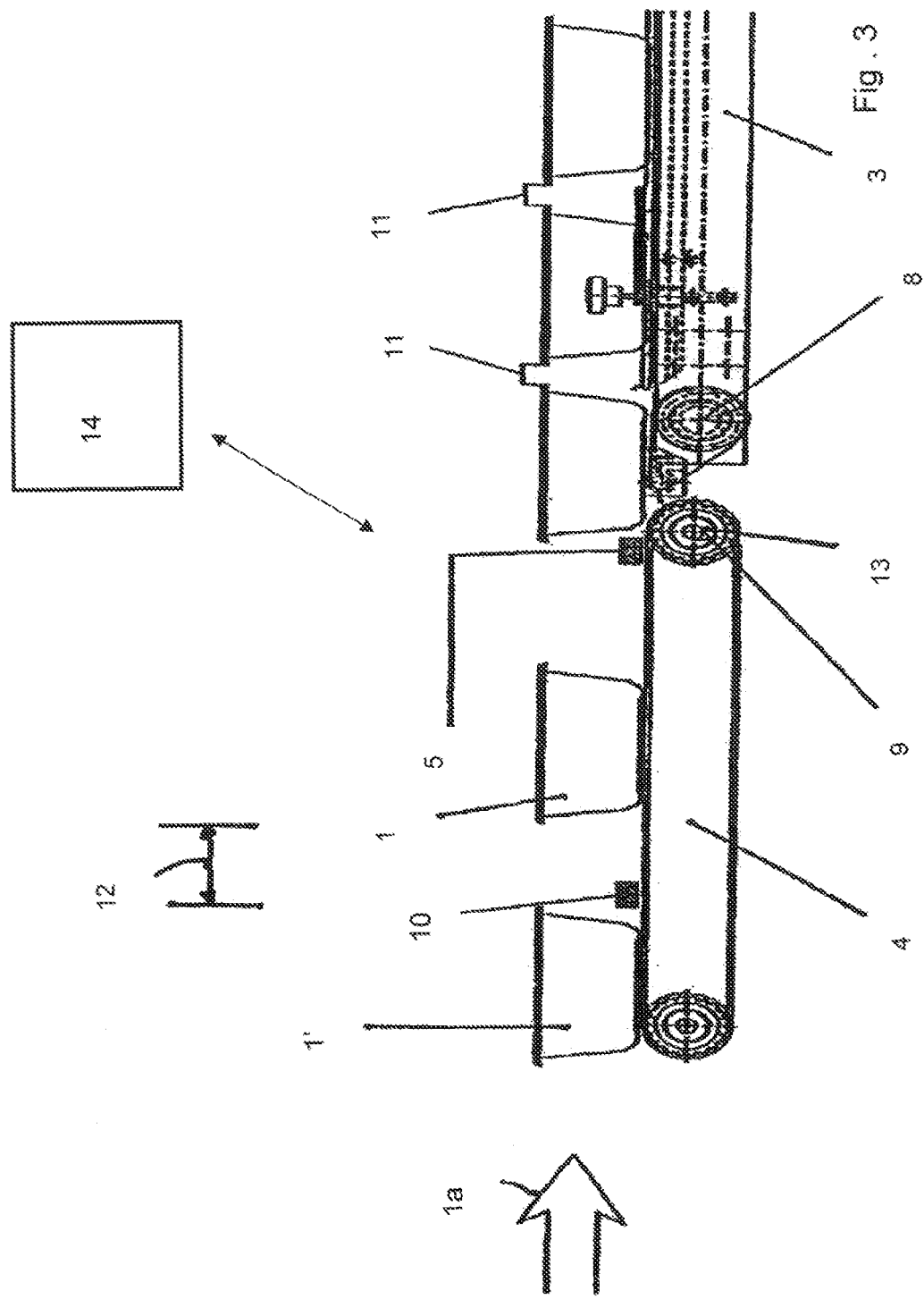

MACHINE FOR SEALING CONTAINERS BY APPLYING A COVERING FILM

This application is the National Stage of International Application No. PCT/EP2005/002540, International Filing Date, Mar. 10, 2005, which designated the United States of America, and which international application was published under PCT Article 21(2) as WO Publication No. WO2005/095212 A1 and which claims priority from European Application No. 04 005 766.3, filed Mar. 11, 2004 and European Application No. 04 005 990.9 filed Mar. 12, 2004.

TECHNICAL FIELD

The present invention is related to a machine for sealing containers by applying a covering film or a lid.

BACKGROUND OF INVENTION

These machines are generally known. For these machines, it is necessary that several containers are located with a certain gap pattern, for example equidistantly, on an accumulation unit, before they are grabbed by a pusher arm, which transports the container to the sealing system, where a film is applied to the containers. EP 0 680 880 for example describes an infeed system which allows the equidistant accumulation of containers on the accumulation belt. The infeed system comprises an accumulation unit, a feeder unit and at least one buffer conveyor which is interposed between the accumulation unit and the feeder unit. With the buffer conveyor it is assured that the containers are handed over to the accumulation unit at a pre set speed and at a pre set position. The containers are grabbed by the pusher arm while they are moved by the accumulation unit. This system works well, but is relatively complicated. Especially if two or more (parallel) lanes of containers are fed by the feeder unit in the direction of the accumulation unit, it is mandatory that two (or more) of such containers being conveyed in parallel are aligned with a relatively high accuracy, e.g. at the same downstream position, i.e. relative to (the beginning of) the accumulation unit. Therefore, known machines are not tolerant to misalignments of such containers conveyed in parallel and, e.g. side by side.

SUMMARY OF THE INVENTION

It is therefore the object of the present invention to provide a machine for sealing containers, which does not have the disadvantages of the state of the art.

It was totally surprising and could not have been expected by a person skilled in the art that the inventive machine allows to convey containers, especially trays, to an accumulation unit in parallel and in such a manner and by very simple means that the tolerance to misalignment on the feeder unit is greatly enhanced. The inventive machine is operated easily and needs little maintenance.

The inventive machine for sealing containers has a container sealing system, which applies a covering film on the containers. Additionally, the machine has an infeed system for feeding the containers to the sealing system, which comprises an accumulation unit which is located upstream of the sealing system and a feeder unit which feeds the containers to the accumulation unit. The feeder unit as well as the accumulation unit is driven by motor means. In the inventive machine, according to a first alternative, the feeder unit comprises at least a first feeder conveyor and a second feeder conveyor, and according to a second alternative, the accumulation unit comprises at least a first accumulation conveyor and a second accumulation conveyor, or, according to a third alternative both the feeder unit and the accumulation unit comprise each two conveyors. The first and second conveyors are always arranged at least partially in parallel and are provided such that containers are fed to the accumulation unit by the first feeder conveyor independently from the second feeder conveyor and/or that containers are fed after the feeder unit by the first accumulation conveyor independently from the second accumulation conveyor. Preferably, parallel conveyors comprise two different motors, especially servo motors, i.e. the motor means driving the feeder unit comprise two distinct motors and/or the motor means driving the accumulation unit comprise two distinct motors. Alternatively, the first and second feeder conveyor can be driven by one single motor and/or the first and second accumulation conveyor can be driven by one single motor, but in this case the driving action of such a single motor can be either directed to one or the other or to both of the first and second conveyors.

Preferably, the feeder unit of the inventive machine comprises a first sensor (at least at the first feeder conveyor) which is preferably located in the end zone of the feeder unit and which detects the containers on the feeder unit, preferably their front edge. The speed of motion of the feeder unit or of at least the first feeder conveyor is preferably detected by detection means and/or the speed is maintained constant. The first sensor and the detection means are connected to a control unit which controls the motor means of the accumulation unit (or at least the first accumulation conveyor) such that the correct gap between two adjacent containers on the accumulation unit (or at least the first accumulation conveyor) is achieved and that the speed of the accumulation unit (or at least of the first accumulation conveyor) and the speed of the feeder unit (or at least of the first feeder conveyor) are synchronised during the handing over of the containers from the feeder unit to the accumulation unit. If the speed of the feeder unit (or at least the speed of the first feeder conveyor) is maintained constant, no speed detection means are needed, but the control unit must have the information about the magnitude speed of the feeder unit or the first feeder conveyor. In this case, the speed of the second feeder conveyor is preferably not constant, i.e. preferably the two feeder conveyors can be driven independently.

Preferably, the machine comprises a second sensor which is located upstream of the first sensor and which detects the distance between two containers on the feeder unit (or at least the first feeder conveyor). The second sensor is preferable also connected to the control unit which also controls the motor means of the feeder unit or at least the first feeder conveyor. If the distance between two consecutive trays e.g. on the first feeder conveyor is significantly smaller than the desired gap, the control unit reduces temporarily the speed of the first feeder conveyor and/or it temporarily stops the back-tray via a technical mean, preferably a mechanical mean.

The motor means of the accumulation unit and/or the motor means of the feeder unit can be any motor known by a person skilled in the art. However a servomotor and a motor with full rotation intelligent control via an electronic cam are preferred.

The inventive machine comprises additionally pusher arms which can be detachably associated with multiple containers on the accumulation unit to transfer the containers to the sealing system and from the sealing system to a conveyor, which is located downstream of the sealing system for removing the sealed containers from the inventive machine.

The person skilled in the art understands that also the second feeder conveyor can be equipped with sensors analogue to the first sensor and/or the second sensor. If there are misalignments of containers on the first and second feeder conveyor or on the feeder unit, they can be cancelled and/or adjusted by independently driving either the first and second feeder conveyors or the first and second accumulation conveyors by means of the motor means or by means of distinct motors comprised by the motor means and driving separately first and second feeder or accumulation conveyors. According to the invention, it is therefore possible to realise the following advantages:

In case of a misalignment of two or more containers conveyed in parallel and preferably side by side on the feeder unit or on first and second feeder conveyors, is not necessary to stop the conveyors or containers (completely) in order to adjust alignment, thereby non-solid product handling is greatly enhanced.

Micro-misalignment of containers on feeder unit or on first and second feeder conveyor causes, if ever, less important slowdown or reduction of capacity of the machine.

Mechanical alignment stopper used currently to assure, e.g. side by side, alignment of containers are no longer needed. Therefore, there is no more need to adjust such mechanical alignment stopper depending on container height, container material and/or container weight.

Furthermore, the incoming flux of containers can be handled with more freedom because it is possible to provide, e.g. a first number of containers on the first feeder conveyor and a different second number of containers on the second feeder conveyor as well as on the respective sides of the accumulation unit following the first/second feeder conveyor, respectively, or on the first and second accumulation conveyor.

Further characteristics and advantages will become apparent from the following detailed description of FIGS. 1 to 4, which are, however, non restricting examples of the present invention.

BRIEF DESCRIPTION OF THE DRAWINGS

FIG. 1 shows a perspective view of one embodiment of the infeed system of the inventive machine.

FIG. 2 shows a side view of one embodiment of the infeed system of the inventive machine.

FIG. 3 shows the inventive machine with two sensors.

DETAILED DESCRIPTION OF THE INVENTION

Figure 4A:
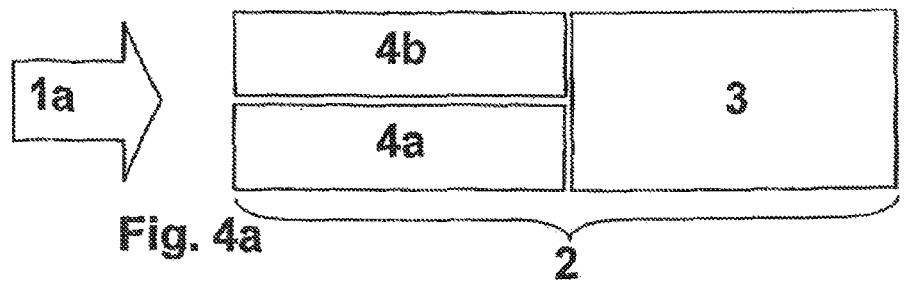
FIG. 4 shows schematically three different embodiments of the infeed system of the inventive machine.

FIG. 1 shows the infeed system 2 for feeding containers (not shown in FIG. 1) to be sealed to the sealing system (not shown). The infeed system 2 comprises an accumulation unit 3 and a feeder unit 4. The person skilled in the art understands that more than two feeder conveyors are possible. In the first embodiment of the infeed system 2 of the inventive machine shown in FIGS. 1 to 3, the feeder unit 4 comprises a first feeder conveyor 4a and a second feeder conveyor 4b and the accumulation unit 3 comprises two different belts extending in parallel which are, however, driven simultaneously by common motor means.

In FIG. 2, a side view of the first embodiment of the infeed system 2 of the inventive machine is shown. Therefore, only the first feeder conveyor 4a of the feeder unit 4 is visible. In the view shown in FIG. 2, the second feeder conveyor 4b is to be imagined behind the first feeder conveyor 4a and preferably in rather the same manner. The direction of motion 1a of containers 1 is indicated by an arrow. In the present example, the first feeder conveyor 4a is an endless belt. The first feeder conveyor 4a comprises a first sensor 5 which detects the front edge 7 of the containers 1. The first feeder conveyor 4a is driven, preferably continuously, by a motor means 13. The motor means 13 drives the feeder unit 4 as a whole. According to the invention, the motor means 13 can either comprise two distinct motors for the first and second feeder conveyor respectively, or the motor means 13 can comprise one single motor driving both the first feeder conveyor 4a and the second feeder conveyor 4b together with at least one separating means like a gear or a tending means in order to be able to separately and independently from one another drive the first and second feeder conveyors 4a, 4b.

Additionally, the first feeder conveyor 4a comprises detection means 9 to detect the speed of motion of the first feeder conveyor 4a. Alternatively, it is possible to operate the first feeder conveyor 4a at a constant speed. Then the detection means 9 are not needed. The signal of the first sensor 5 and the signal of the detection means 9 or the constant speed are transferred to a control unit 14 that controls motor means 8, which drives the accumulation unit 3. Based on these signals of the sensor 5 and the information about the speed of the first feeder conveyor 4a, the control unit controls the motor 8 such that the correct gap between two adjacent containers 1, 1' is created on the accumulation unit 3 and that the speed of the accumulation unit 3 and the first feeder conveyor 4a are synchronised at least partly during the handing over of the containers 1 from the first feeder conveyor 4 to the accumulation unit 3. This is done as follows:

The accumulation unit 3 stands still until sensor 5 detects a new tray 1, i.e. a new container 1. Based on the desired gap 11, motor means 8 accelerate the accumulation unit 3 and/or the second feeder conveyor 4b faster or slower until the accumulation unit 3 has reached a velocity related to the first feeder conveyor 4a and/or the second feeder conveyor 4b. Preferably, when two trays 1 (conveyed preferably side by side on the first and second feeder conveyor 4a, 4b) arrive near the accumulation unit 3, any important misalignments of these two trays 1 are cancelled due to the possibility to drive the first feeder conveyor 4a independently from the second feeder conveyor 4b (and vice versa). The speeds of the first and second feeder conveyors 4a, 4b can then be almost equal. Then, the speed of the accumulation unit 3 can preferably be set approximately to the speed of the first/second feeder conveyor 4a/4b. This process is controlled by a control unit 14. This velocity of the accumulation unit 3 (or accumulation belt 3) is then preferably maintained until the two containers 1 have at least partially been handed over from the first and the second feeder conveyor 4a, 4b to the accumulation unit 3. After this handing over, the accumulation belt 3 is decelerated again until it comes to a stop. The rate of deceleration is also based on the size of the desired gap 11. The person skilled in the art understands that the accumulation belt 3 needs not come to complete stop after each positioning of a containers 1. Only if one set of containers 1 on the accumulation unit 3 is completed, the accumulation unit 3 comes to a complete stop and two pusher arms 15 grab the containers 1 and feed them to the sealing system 16.

FIG. 3 shows the infeed system 2 for feeding containers 1 to be sealed according to FIG. 2 but with a second sensor 10 which is located upstream of sensor 5. This second sensor 10 measures the distance 12 between two consecutive sets of containers 1 and 1' on the first feeder conveyor 4a and/or the second feeder conveyor 4b. If this distance 12 is smaller than the minimum gap needed for the handover of trays 1 before consecutive trays 1' are coming to the handover position as well, the control unit slows down motor means 13 of the first feeder conveyor 4a and/or the second feeder conveyor 4b to give the accumulation unit 3 enough time to increase the distance between trays 1 and 1', before trays 1' are in the handover position to the accumulation unit 3. This increases the distance between containers 1 and 1', so that the control unit is able to maintain the desired gaps 11. Alternatively or in combination with the above mentioned control scheme a mechanical mean can temporarily slow down the tray 1' in order to increase the gap between 1 and 1'.

Figure 4B:
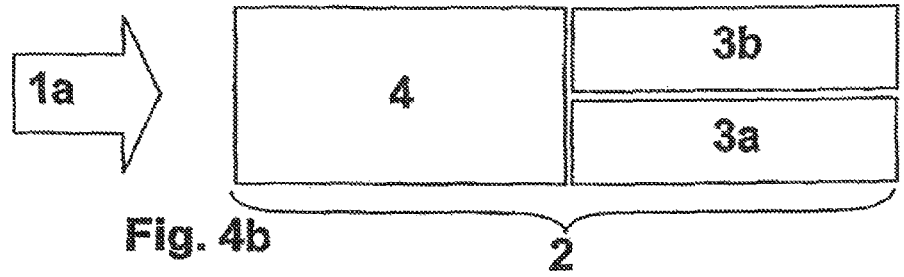
Figure 4C:
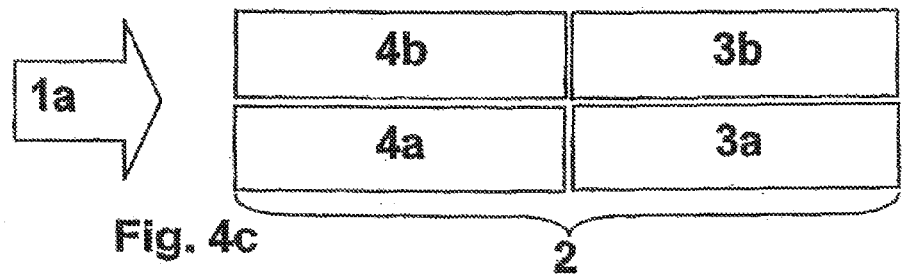

In FIG. 4, a schematical view of three different embodiments of the infeed system 2 of the inventive machine is shown. FIG. 4a shows the first embodiment explained in detail by FIGS. 1 to 3. In this first embodiment, the feeder unit 4 comprises the first and second feeder conveyor 4a, 4b and the accumulation unit 3 comprises either one single conveyor belt or two conveyor belts that are driven simultaneously. FIG. 4b shows a second embodiment in which the feeder unit 4 comprises either one single conveyor belt or two conveyor belts that are driven simultaneously, and in which the accumulation unit 3 comprises a first accumulation conveyor 3a and a second accumulation conveyor 3b. In this case, the first and second accumulation conveyors 3a, 3b can be driven independently from each other. Depending on the speed of the feeder unit 4 and depending on the instantaneous gap of consecutive trays 1, 1' on the feeder unit 4 compared to the desired gaps 11 on either the first accumulation conveyor 3a and/or the second accumulation conveyor 3b the speed of the accumulation conveyors 3a, 3b are controlled by the control unit, e.g. the speed of the feeder unit 4 can be constant and the speed of the accumulation conveyors 3a, 3b is adapted. The second embodiment has the advantage that the control of the handover process can be realised in a comparatively simple manner. FIG. 4c shows a third embodiment in which both the feeder unit 4 and the accumulation unit 3 comprise each a first and a second conveyor which can be driven independently from each other, i.e. the first feeder conveyor 4a is driven independently from the second feeder conveyor 4b and the first accumulation conveyor 3a is driven independently from the second accumulation conveyor 3b. In this third embodiment, each "line" of the infeed system 2, i.e. on the one hand the first feeder conveyor 4a together with the first accumulation conveyor 3a and on the other hand the second feeder conveyor 4b together with the second accumulation conveyor 3b, can be controlled independently from each other. The handover of trays 1 from the feeder unit 4 to the accumulation unit 3 can be realized either by driving, e.g. the first feeder conveyor 4a, at constant speed and by controlling the speed of the first accumulation conveyor 3a accordingly as described above, or by driving, e.g. the first accumulation conveyor 3a at constant speed and by controlling the speed of the first feeder conveyor 4a accordingly as described above.

A person skilled in the art understands, that in the second and third embodiment of the infeed system 2, the motor means 8 drives the accumulation unit 3 as a whole. According to the invention, the motor means 8 can either comprise two distinct motors for the first and second accumulation conveyor 3a, 3b respectively, or the motor means 8 can comprise one single motor driving both the first accumulation conveyor 3a and the second accumulation conveyor 3b together with at least one separating means like a gear or a tending means in order to be able to separately and independently from one another drive the first and second accumulation conveyors 3a, 3b.

A person skilled in the art further understands that the control unit is adapted to the embodiment of the infeed system 2 and that the control unit controls the drive means 8, 13 accordingly, i.e. dependent on the number of conveyors before and after the location where the handover of containers or trays takes place between the feeder unit 4 and the accumulation unit 3. In the second embodiment, the feeder unit 4 as a whole as well as the first and second accumulation conveyor 3a, 3b have to be controlled by the control unit. In the third embodiment, the first and second feeder conveyor 4a, 4b as well as the first and second accumulation conveyor 3a, 3b have to be controlled by the control unit, even if in this third embodiment the control of the first feeder conveyor 4a and the first accumulation conveyor 3a can be separated from the control of the second feeder conveyor 4b and the second accumulation conveyor 3b.

It is to be understood that an identical container alignment/arrangement pattern on the accumulation unit 3 (or on the first and second accumulation conveyors 3a, 3b) subsequent the first or the second feeder conveyor 4a, 4b or subsequent the feeder unit 4 as a whole is not necessary according to the invention. Therefore, a handover of two or more containers 1 from the first and the second feeder conveyor 4a, 4b to the accumulation unit 3 or from the feeder unit 4 to the first and second accumulation conveyor 3a, 3b does not necessarily be simultaneous; it is also possible to handover the containers 1 differently, for example intermittently one container 1 from one side of the infeed system 2 and one from other side of the infeed system 2, i.e. two (or more) containers 1 are not placed necessarily "side by side" on the accumulation unit 3.

LIST OF REFERENCE NUMBERS 1, 1' containers
1a direction of motion
2 infeed system for feeding containers
3 accumulation unit
3a first accumulation conveyor
3b second accumulation conveyor
4 feeder unit
4a first feeder conveyor
4b second feeder conveyor
5 first sensor
6 end-zone of the feeder unit
7 front edge of the container
8 motor means
9 detection means
10 second sensor
11 desired gap
12 random distance between two trays
13 motor means
14 control unit
15 pusher arms
16 sealing system

The invention claimed is:

1. A machine for sealing containers comprising:
a container sealing system, which is located downstream of an infeed system for feeding containers to be sealed, the infeed system comprising:
   a) an accumulation unit;
   b) at least one motor for driving the accumulation unit;
   c) a motor driven feeder unit directly adjacent to the accumulation unit and is located upstream relative to the accumulation unit;
   d) at least one sensor; and
   e) at least one detector;
   wherein the feeder unit feeds containers to the accumulation unit, and the feeder unit further comprises:
      i. at least a first feeder conveyor, and
      ii. a second feeder conveyor,
   wherein the first and second feeder conveyors have an end zone and are arranged at least partially in parallel and are provided such that containers are fed to the accumulation unit by the first feeder conveyor independently from the second feeder conveyor, wherein the accumulation unit comprises:
  i. at least a first accumulation conveyor and
  ii. a second accumulation conveyor,
wherein the first and second accumulation conveyors are arranged at least partially in parallel, and the first accumulation conveyor operates independently from the second accumulation conveyor;
wherein at least the first feeder conveyor further comprises:
  i. the at least one sensor in the end-zone of the first feeder conveyor, and
  ii. the at least one detector,
wherein the at least one sensor and the at least one detector are connected to a control unit, which controls the at least one motor driving the accumulation unit such that a desired gap is created between two adjacent containers on the accumulation unit and that the speeds of:
  i. the accumulation unit and
the first feeder conveyor, are synchronised at least partially during a handing over of the containers from the first feeder conveyor to the accumulation unit.

2. The machine according to claim 1, wherein the at least one motor driving the first and second feeder conveyors comprise two independent motors, wherein the two independently driven motors are servo motors, and/or the motors driving the first and second accumulation conveyors comprising two independent motors, wherein the two independently driven motors are servo motors.

3. The machine according to claim 1, wherein the first feeder conveyor further comprises a second sensor upstream from the first sensor, which detects the distance between two containers on the first feeder conveyor.

4. The machine according to claim 3, wherein the second sensor is connected to the control unit, which reduces the speed of the first feeder conveyor if the distance of two consecutive containers on the first feeder conveyor is significantly smaller than the minimum gap needed for handover of consecutive containers.

5. The machine according to claim 1, wherein the at least one motor is a servo motor.

6. The machine according to claim 1, wherein the first feeder conveyor operates at continuous or variable speed.

7. The machine according to claim 1, further comprising pusher arms, which can be detachably associated with multiple containers on the accumulation unit to transfer the containers to the sealing system.

8. The machine according to claim 7, wherein the pusher arms feed the containers into the sealing system.

9. The machine according to claim 1, wherein a transfer is carried out while the accumulation unit stands still.

10. The machine according to claim 1, wherein the second feeder conveyor further comprises:
  i. a second sensor in the end-zone of the second feeder conveyor, and
  ii. a second detector,
  wherein the second sensor and the second detector are connected to the control unit, which controls the at least one motor for driving the accumulation unit such that a desired gap is created between two adjacent containers on the accumulation unit and that the speeds of
    i. the accumulation unit and
    ii. the second feeder conveyor, are synchronised at least partially during a handing over of the containers from the second feeder conveyor to the accumulation unit.

11. The machine according to claim 10, wherein the second feeder conveyor further comprises a second sensor upstream from the first sensor, which detects the distance between two containers on the second feeder conveyor.

12. The machine according to claim 1, wherein no mechanical alignment stopper is needed to ensure side by side alignment of the containers.

13. A conveyor system comprising:
  a) a feeder unit having an end-zone;
  b) an accumulation unit, directly adjacent to the feeder unit;
  c) at least one sensor located in the end-zone of the feeder unit;
  d) at least one motor;
  e) at least one detector connected to the feeder unit; and
  f) a control unit;
  wherein the feeder unit and accumulation unit are motor driven;
  wherein the feeder unit is further comprised of:
    i. a first feed conveyor and
  a second feed conveyor, wherein the first feed conveyor and the second feed conveyor can operate independently of each other;
  wherein the accumulation unit is located downstream of the feeder unit so that containers are handed over from the feeder unit to the accumulation unit, and the accumulation unit is further comprised of:
    i. a first accumulation conveyor and
  a second accumulation conveyor, wherein the first accumulation conveyor and the second accumulation conveyor can operate independently of each other;
    wherein the at least one sensor is connected to the control unit, which controls the at least one motor driving the accumulation unit so that the speed of the accumulation unit and the speed of the feeder unit are synchronized during the handing over of a container from the feeder unit to the accumulation unit;
    wherein the at least one detector measures the speed of the feeder unit, and the detector is connected to the control unit so that the control unit can synchronize the speeds of the feeder unit and the accumulation unit; and
    wherein the first feeder conveyor and the second feeder conveyor are partially in parallel, and the first accumulation conveyor and the second accumulation conveyor are partially in parallel.

14. A conveyor system according to claim 13, wherein the first feeder conveyor and the second feeder conveyor each have an independently driven servo motor.

15. A conveyor system according to claim 13, wherein the first accumulation conveyor and the second accumulation conveyor each have an independently driven servo motor.

16. A conveyor system according to claim 15, wherein the containers are transferred from the feeder unit to the accumulation unit while the accumulation unit stands still.

17. A conveyor system comprising:
  a) a conveyor arrangement consisting essentially of:
    i. a feeder unit having an end-zone;
    ii. an accumulation unit, directly adjacent to the feeder unit;
  b) a first sensor located in the end-zone of the feeder unit;
  c) a second sensor located upstream of the first sensor;
  d) at least one motor;
  e) at least one detector connected to the feeder unit; and
  f) a control unit in communication with the sensors, wherein the sensors operate to detect containers and send signals to the control unit which controls speed of the at least one motor so that the speed of a feeder unit motor and an accumulation unit motor synchronize;

wherein the containers travel from the feeder unit to the accumulation unit, and from the accumulation unit to the sealing system;

wherein the feeder unit is comprised of:
   i. a first feed conveyor and
   ii. a second feed conveyor, wherein the first feed conveyor and the second feed conveyor are at least partially parallel, and can operate independently of each other, wherein the second sensor is located in the first feeder conveyor, the second feeder conveyor, or both so that the distance between two consecutive containers on the first feeder conveyor, the second feeder conveyor, or both is measured;

wherein the accumulation unit is further comprised of:
   i. a first accumulation conveyor and
   ii. a second accumulation conveyor, wherein the first accumulation conveyor and the second accumulation conveyor are at least partially parallel, the first accumulation conveyor and the second accumulation conveyor can operate independently of each other, and the accumulation motor is a servo motor;

wherein the first sensor is connected to the control unit, which controls the accumulation unit motor so that the speed of the first or second accumulation conveyor and the speed of the first or second feeder conveyors are synchronized during the handing over of a container from the first feeder conveyor to the first accumulation conveyor or from the second feeder conveyor to the second accumulation conveyor; and wherein the at least one detector measures the speed of the first or second feeder conveyor, and the detector is connected to the control unit so that the control unit can synchronize the speeds of the feeder conveyors and the accumulation conveyors.

* * * * *

UNITED STATES PATENT AND TRADEMARK OFFICE
CERTIFICATE OF CORRECTION

| | | |
|---|---|---|
| PATENT NO. | : 7,997,046 B2 | |
| APPLICATION NO. | : 11/530503 | |
| DATED | : August 16, 2011 | |
| INVENTOR(S) | : Paolo Salvoni | |

It is certified that error appears in the above-identified patent and that said Letters Patent is hereby corrected as shown below:

On the title page item (73), (CFS Palazzolo S.p.A., Palazzolo) is incorrect. Assignee should be "CFS BUHL GMBH"

Signed and Sealed this
Seventh Day of February, 2012

David J. Kappos
*Director of the United States Patent and Trademark Office*